United States Patent [19]
Paruolo et al.

[11] 3,758,215
[45] Sept. 11, 1973

[54] AERODYNAMIC MEANS FOR RAISING AND SWIRLING LOOSE OBJECTS IN EMPTY GLASS CONTAINERS AND OPTICAL MEANS FOR DETECTING THE PRESENCE OF SAME

[75] Inventors: Miller J. Paruolo; John J. McMackin; James H. McMeekin, all of Brockway, Pa.

[73] Assignee: Brockway Glass Company, Inc., Brockway, Pa.

[22] Filed: June 1, 1972

[21] Appl. No.: 258,865

[52] U.S. Cl. .............. 356/196, 250/223 B, 356/197, 356/240
[51] Int. Cl. ...................... G01n 21/16, G01n 21/24
[58] Field of Search ................... 356/196, 197, 198, 356/240; 250/223 B, 219 DF, 240; 255/219 DF

[56] References Cited
UNITED STATES PATENTS

| | | | |
|---|---|---|---|
| 3,576,442 | 4/1971 | Nakamura | 356/197 |
| 3,627,423 | 12/1971 | Knapp et al. | 356/197 |
| 3,677,650 | 7/1972 | Klingler | 356/196 |
| 2,798,605 | 7/1957 | Richards | 356/240 |

Primary Examiner—David Schonberg
Assistant Examiner—V. P. McGraw
Attorney—Conrad Christel et al.

[57] ABSTRACT

Optical inspection apparatus, particularly for detecting the presence of loose objects, usually fragments of broken glass, in glass containers. Light is directed against the side wall of a container and an air or gas jet is directed into the container to create a swirling action and raise loose objects in the container from the bottom thereof for more effective illumination. Light sensitive means is positioned above the container to pick up reflected light from such illuminated fragments and the light sensitive means produces an electrical signal which may be employed to actuate an alarm, to stop the operation of the conveyor or other mechanism, or to operate a rigid mechanism for diverting containers which may have loose glass therein.

9 Claims, 4 Drawing Figures

PATENTED SEP 11 1973　3,758,215

AERODYNAMIC MEANS FOR RAISING AND SWIRLING LOOSE OBJECTS IN EMPTY GLASS CONTAINERS AND OPTICAL MEANS FOR DETECTING THE PRESENCE OF SAME

BACKGROUND OF THE INVENTION

This invention relates to optical detection of the presence of loose glass or other foreign bodies or objects in glass containers.

The use of optical means for detecting defects in glass containers is well known and various forms of such apparatus are available for detecting flaws or defects of various kinds and in various portions of glass containers. Such apparatus is usually employed after glass containers are fully formed and before they are ultimately delivered for shipment or use.

In general, apparatus of this type requires that each individual container be arrested in its forward movement as on a conveyor or the like and that each individual container be then rotated at a prescribed inspection station to detect defects at various points about the walls of the container. Furthermore, such apparatus is not generally adaptable to detecting the presence of foreign objects such as loose glass in the bottom of a container since the curvature of the heel portion of the bottom of a container scatters light in a random fashion which defeats ordinary optical detection methods.

SUMMARY OF THE INVENTION

The apparatus of the present invention is directed especially to detecting loose foreign objects such as broken bits of glass in glass containers and has particular usefulness in connection with filling such containers, as distinguished from the inspection of glass containers per se immediately after manufacture thereof.

The present apparatus is particularly useful in connection with container filling operations since the presence of loose glass in the containers at the time of filling is especially dangerous and is likely to occur due to the breakage of other containers in the various packing and handling steps which precede the filling of the glass containers.

The apparatus of the present invention is also particularly useful in connection with container filling operations since containers may be handled at relatively high speed without the necessity for rotating individual containers for inspection purposes which requires more elaborate and expensive machinery and methods.

According to the present invention containers are fed in a row along a conveyor and past optical inspection apparatus and immediately preceding the actual inspection and at the time of such inspection air jets are directed into the containers to cause a swirling air stream therein which picks up loose glass or other foreign objects which may be present in the bottom of the container and raises the same from the bottom so that the presence of such objects may readily be detected by optical scanning means.

The arrangement of the present invention is such that light is directed through the side walls of containers to impinge upon loose glass or other objects which have been raised from the bottom of the container as aforesaid and suitable light-sensitive optical means may then be directed downwardly into the successive containers from above to receive light rays reflecting from the swirling, moving fragments of glass or other light reflecting foreign objects present in the containers.

DESCRIPTION OF THE ILLUSTRATED EMBODIMENT

Figure 1:
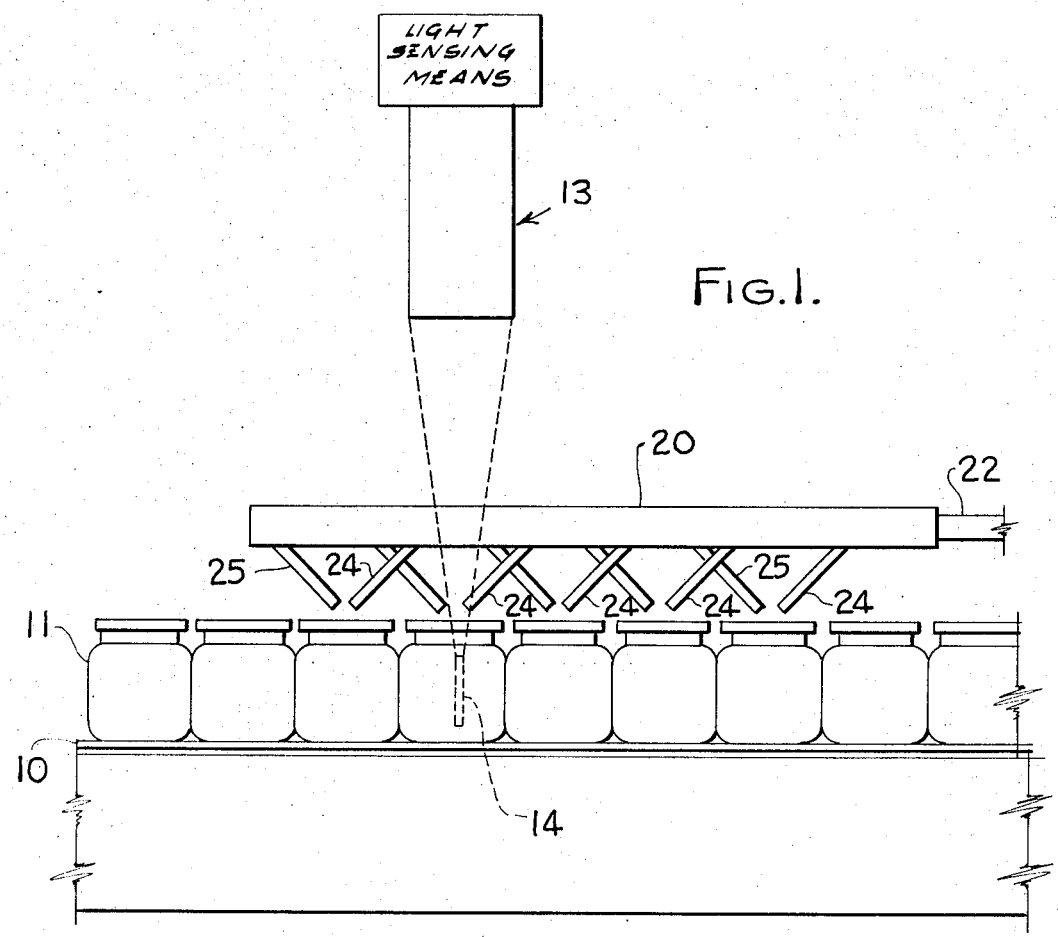
FIG. 1 is a general side elevational view of one form of the apparatus of the present invention.
Figure 3:
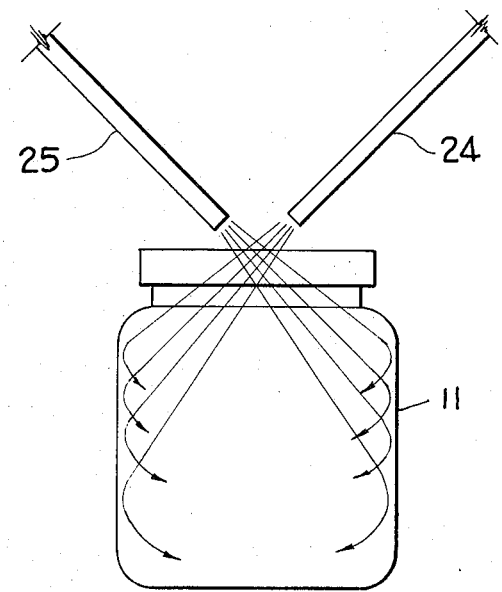
FIG. 3 is a view similar to FIG. 1 but showing a single container to indicate the swirling air action therein.
Figure 2:
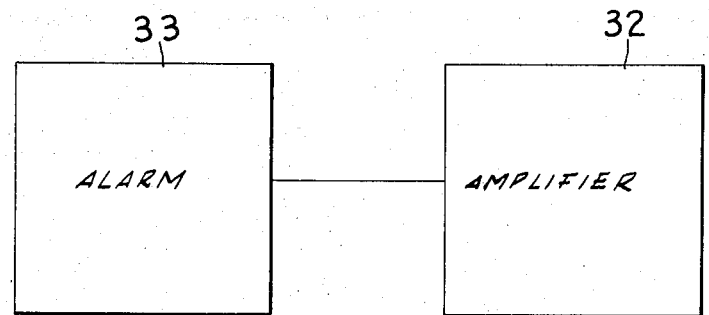
FIG. 2 is an end elevational view thereof viewed from the left-hand end of FIG. 1.

In FIGS. 1 and 2 the numeral 10 designates a conveyor belt along which an alined row of glass containers 11 moves continuously. The containers move past an inspection station which includes illuminating means designated generally by the numeral 12 and transversely alined sensing means indicated generally by the numeral 13.

FIG. 2 shows schematically means for illuminating the containers as they pass the inspection station, the illuminating means being such as to pass a narrow rectangular pattern of light against containers passing the station. The narrow dimension of the pattern of light is horizontal and the elongated dimension is vertical as indicated at 14 in FIG. 1.

Light from a source 15 is directed against a condenser lens system 16 and against a plate 17 which is provided with a narrow vertical slit 18. Light from slit 18 impinges upon an objective lens 19 and is thence directed to the side walls of containers 11 in the form of the aforesaid narrow rectangular pattern of light indicated at 14 in FIG. 1.

Figure 4:
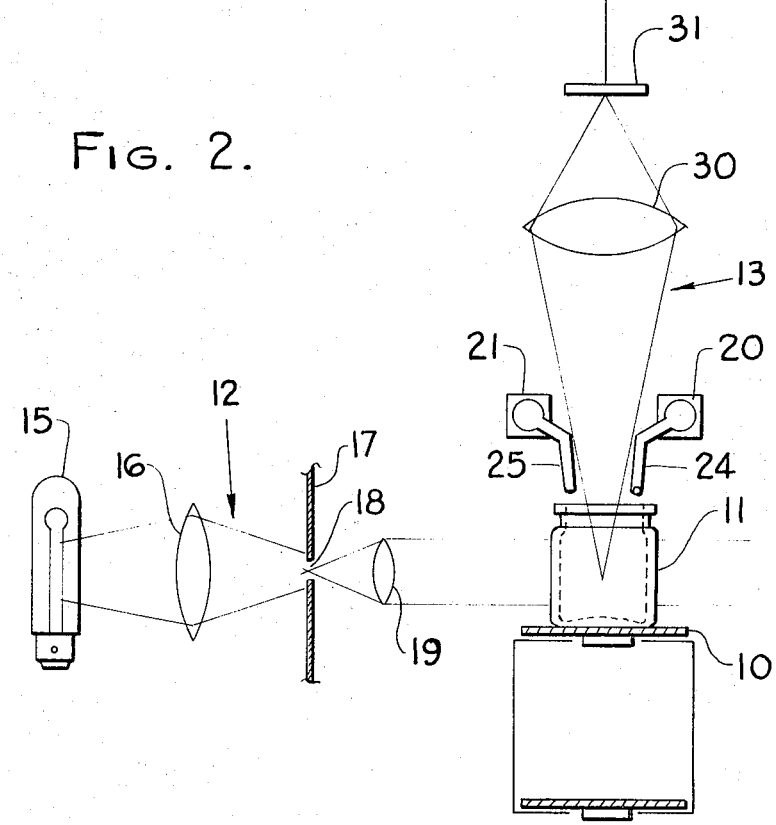
FIG. 4 is a top plan view of the container of FIG. 3.
Figure 4:
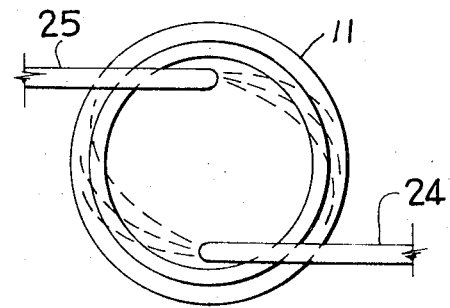

As the containers approach the inspection station they pass beneath longitudinally extending air pressure manifolds 20 and 21 which receive air pressure supplied as by way of a conduit 22. The manifold 20 is provided with a series of downwardly and forwardly directed nozzles 24 and the manifold 21 is provided with a series of downwardly and rearwardly directed nozzles 25. The nozzles 24 and 25 are disposed eccentrically with respect to the longitudinal center line of the row of containers passing beneath the nozzles as clearly shown in FIG. 4 so that air streams issuing from the nozzles into successive containers passing therebeneath produce a swirling air stream within each container which lifts fragments of broken glass or other loose foreign objects and causes the same to rise within the container and to be carried about by the swirling air to pass through the path of the light pattern directed against the containers as heretofore described.

Light reflected from such swirling objects is picked up by the sensing means designated 13 in FIG. 2 which will now be described. As there shown, the sensing means is arranged along the vertical axes of containers as they pass the light directing means and is directed downwardly into successive containers. A condenser lens or lens system designated 30 directs light reflected from particles or objects in the container to a solar cell 31 or other light-sensitive means which converts the light to an electrical impulse which is conducted to a conventional signal conditioning and amplifying means designated 32 in FIG. 2, whereupon the impulse is directed to an alarm signal, a conventional reject control or a conveyor stopping impulse indicated schematially at 33 in FIG. 2.

In simplest form, if the impulse from the signal conditioner and amplifier 32 is employed to stop the conveyor, the operator merely selects the container containing loose glass or the like by inspection and removes the same from the conveyor. In the alternative, if an alarm is sounded by the device 33 the operator manually shuts off the conveyor and similarly selects the container containing loose glass or the like. In the case of employing conventional container reject means, the speed of the conveyor will usually be such that a short series of containers including the faulty container will be rejected. After removal of the undesirable loose material the rejected containers may again be placed on the conveyor.

A preferred embodiment of the method and apparatus of the present invention has been described herein and shown in the accompanying drawings to illustrate the underlying principles of the invention but is to be understood that numerous modifications may be made without departing from the broad spirit and scope of the invention.

We claim:

1. Optical inspection apparatus for normally empty glass containers comprising means for illuminating the interiors of such containers, means directing an air current into the containers to create a swirling action for agitating loose objects in said containers and thus raise the same from the bottoms of the containers to facilitate illumination thereof, light sensitive means positioned to receive light reflected from such objects, and electrical control means under the influence of said light sensitive means.

2. Apparatus as in claim 1 wherein said illuminating means is directed against the side walls of containers and wherein said light sensitive means is directed downwardly into said containers.

3. Apparatus as in claim 1 wherein said air current is directed into said containers generally tangentially to create an effective swirling action.

4. Apparatus as in claim 2 wherein said air current is directed into said containers generally tangentially to create an effective swirling action.

5. Apparatus as in claim 1 including a conveyor for passing a continuous row of containers past said inspection apparatus.

6. Apparatus as in claim 5 wherein said air current means includes a plurality of nozzles spaced along said conveyor in advance of said inspection apparatus and up to the same whereby the swirling action is initiated before a container arrives at the inspection apparatus.

7. Apparatus as in claim 5 wherein the illuminating means is directed against containers substantially at right angles to the direction of said conveyor.

8. Apparatus as in claim 7 wherein the illuminating means directs a beam of light of narrow vertically extending rectangular cross-section against the side walls of containers.

9. A method of detecting loose objects in normally empty glass containers comprising illuminating the interiors of such containers and simultaneously applying a swirling action of air to the interior of the container to agitate and raise loose objects therein, and scanning the interior of such container with light sensitive means to detect the presence of such loose objects by light reflected therefrom to produce an electrical signal in response to the presence of such loose objects.

* * * * *